United States Patent
Johannsson et al.

(10) Patent No.: US 9,772,642 B2
(45) Date of Patent: Sep. 26, 2017

(54) METHOD OF DETERMINING REMEDIAL CONTROL ACTIONS FOR A POWER SYSTEM IN AN INSECURE STATE

(71) Applicant: Danmarks Tekniske Universitet, Kgs. Lyngby (DK)

(72) Inventors: Hjortur Johannsson, Reykjavik (IS); Johannes Tilman Gabriel Weckesser, Dyssegard (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 616 days.

(21) Appl. No.: 14/369,569

(22) PCT Filed: Dec. 20, 2012

(86) PCT No.: PCT/EP2012/076351
§ 371 (c)(1),
(2) Date: Jun. 27, 2014

(87) PCT Pub. No.: WO2013/098184
PCT Pub. Date: Jul. 4, 2013

(65) Prior Publication Data
US 2015/0005967 A1 Jan. 1, 2015

Related U.S. Application Data

(60) Provisional application No. 61/580,805, filed on Dec. 28, 2011.

(30) Foreign Application Priority Data

Dec. 28, 2011 (EP) ..................................... 11195960

(51) Int. Cl.
*H02J 3/46* (2006.01)
*G05F 1/66* (2006.01)
(Continued)

(52) U.S. Cl.
CPC ................ *G05F 1/66* (2013.01); *G05D 5/00* (2013.01); *G06Q 50/06* (2013.01); *H02J 3/24* (2013.01); *H02J 3/46* (2013.01)

(58) Field of Classification Search
None
See application file for complete search history.

(56) References Cited

U.S. PATENT DOCUMENTS 5,187,454 A * 2/1993 Collins .................. H03H 11/30
333/17.3
6,219,591 B1 * 4/2001 Vu ........................ G01R 31/085
700/286
(Continued)

FOREIGN PATENT DOCUMENTS

JP 2005168113 A 6/2005

OTHER PUBLICATIONS

Teng et al.;"Research on Real-time Transient Stability Emergency Control of a Power System"; Proceedings of the CSEE vol. 23 No. 1; Jan. 31, 2003.
(Continued)

*Primary Examiner* — Isaac T Tecklu
(74) *Attorney, Agent, or Firm* — Brinks Gilson & Lione

(57) ABSTRACT

A method of determining remedial control actions for a power system in an insecure and unstable operating condition is provided. The power system has a plurality of generators injecting power into a network and each generator has a generator injection impedance and a stability boundary in the injection impedance plane. A system safety boundary is calculated based on a predetermined network operating safety margin for each generator, the generator injection impedance is compared with the safety boundary and it is determined whether each generator is safe or unsafe. A remedial control action is determined comprising a scheme for re-dispatching power generation for each unsafe (Continued)

generator to thereby establish a secure operating condition for the power system. A new safe operating point in the impedance plane for each unsafe generator may be determined, and a distance between the generator injection impedance and the new safe operating point is calculated under the assumption of constant voltage magnitude for each unsafe generator. The unsafe generator operation is remedied by reducing power generation of the unsafe generator.

19 Claims, 12 Drawing Sheets

(51) Int. Cl.
    *H02J 3/24*     (2006.01)
    *G05D 5/00*     (2006.01)
    *G06Q 50/06*     (2012.01)

(56) References Cited

U.S. PATENT DOCUMENTS

| | | | | |
|---|---|---|---|---|
| 2002/0005668 | A1* | 1/2002 | Couture | H02G 7/00 307/98 |
| 2008/0074810 | A1* | 3/2008 | Guzman-Casillas | H02H 7/065 361/20 |
| 2009/0299664 | A1* | 12/2009 | Zhang | G05F 1/70 702/65 |
| 2011/0005567 | A1* | 1/2011 | VanderSluis | H02J 3/383 136/244 |
| 2014/0343881 | A1* | 11/2014 | Johannsson | H02J 3/18 702/65 |

OTHER PUBLICATIONS

Wang et al."Distributed Coordinative Emergency Control Based on Multi-Agent System"; Power System Technology;vol. 28 No. 3; Feb. 29, 2004.

Huo et al.; "Research on Emergency Control Decision-Making Method Based on Stability Boundary Theory of a Power System"; Moder Electric Power vol. 22 No. 5; Oct. 31, 2005.

Xu et al; "Transient Stability Preventative Control, Emergency Control and Coordination therebetween of a Power System Based on a Dynamic Security Region"; Electric Power Automation Equipment vol. 28 No. 8, Aug. 31, 2009.

Office Action for Chinese Application No. 201280069551.2, dated Dec. 30, 2015.

Webster, "Wiley Encyclopedia of Electrical Engineering", Jan. 1, 1999.

Hjörtur Jóhannsson, "Development of Early Warning Methods for Electric Power Systems", vol. 1, No. 1, Jun. 14, 2011.

International Search Report and Written Opinion for PCT:EP2012:076351, dated Jun. 17, 2013.

* cited by examiner

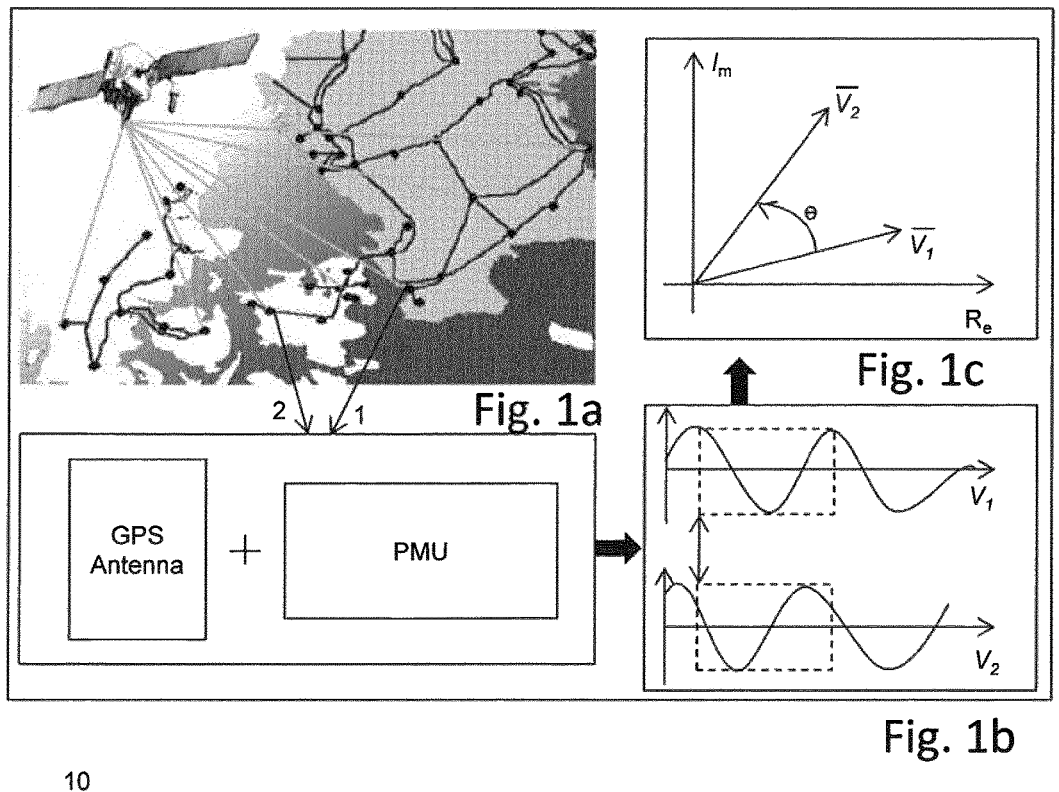
Fig. 1a
Fig. 1c
Fig. 1b
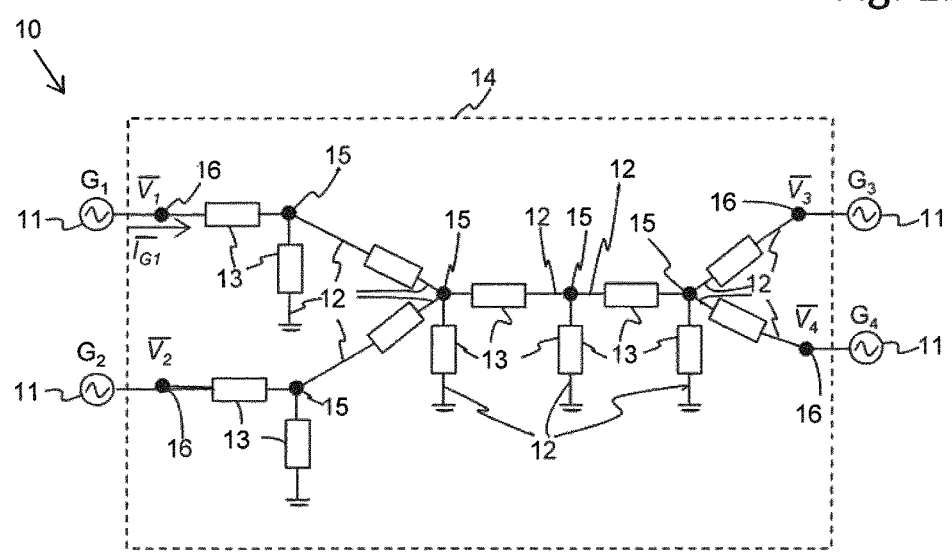
Fig. 2

METHOD OF DETERMINING REMEDIAL CONTROL ACTIONS FOR A POWER SYSTEM IN AN INSECURE STATE

RELATED APPLICATIONS

This application claims the benefit under 35 U.S.C. §371 of International Application No. PCT/EP2012/076351, having an International Filing Date of Dec. 20, 2012, which claims priority to European Application No. EP 11195960.7, filed Dec. 28, 2011, and U.S. Provisional Application No. 61/580,805, filed Dec. 28, 2011, the contents of all of which are incorporated herein by reference in their entirety.

FIELD OF INVENTION

The present invention relates to power systems, and specifically to a method of determining a remedial control action for a power system having a plurality of generators and being in an unstable or insecure state, especially to real-time determination of remedial control actions to be carried out.

BACKGROUND OF THE INVENTION

In recent years, there has been a tendency towards power systems having more and smaller energy sources providing input to the power networks. The focus on climate change and the consequential focus on reduction of $CO_2$ emissions lead away from large coal fired power generators providing a significant share of the total input to the power system, and towards power systems where the share of power from renewable energy sources, such as power from wind, water or solar energy sources, is significantly higher than hitherto. However, renewable energy sources are relatively uncontrollable and typically each renewable energy source is relatively small and they are typically spread over a wide area in the power system.

The existing transmission systems are not necessarily designed to handle these new production patterns, and traditional approaches where security assessment has been carried out off-line by system planners are insufficient in today's complex networks, which was clearly seen from the major blackouts in electric power systems in Sweden and Denmark in September, 2003 and in North-Eastern and Mid-Western United States and parts of Canada in August 2003, each affecting millions of people.

Thus, because of the limited predictability of the renewable energy sources, the productions patterns may change more rapidly than before and, hence, the slow off-line calculation and/or analysis are no longer sufficient.

In response to these new production patterns, sophisticated computer tools have been developed for power system analysis and led e.g. to the use of Phasor Measurement Units (PMU's) that provide synchronized measurements in real time, of voltage and current phasors along with frequency measurements. The introduction of PMUs together with advances in computational facilities and communications, opened up for new tools for controlling, protecting, detecting and monitoring of the power systems.

Some systems have been suggested using only the system voltage phase angle measurements for assessing the system operating conditions. However, it is a disadvantage of these systems that a representation using only the voltage phase angle measurements does not provide a unique representation of a power system operating condition.

Furthermore, multidimensional nomograms have been suggested for the purpose of monitoring the overall system stability or security boundaries, however, the critical boundaries are determined in an offline analysis where multiple critical boundary points have been determined by stressing the system in various directions away from a given base operating point. However, it is a disadvantage of this approach that the boundaries are determined for a specific base case and a fixed system topology. If the system is subjected to any topological change (e.g. tripped lines due to maintenance), the actual approach may introduce an uncertainty for the assessment of security margin, as it has been based on the non-changed topological structure.

Some tools are capable of determining whether a power system is in a stable or an unstable condition, and in Jóhannsson, H., Garcia-Valle, R., Weckesser, J. T. G., Nielsen, A. H., and Østergaard, J., "Real-time stability assessment based on synchrophasors", PowerTech, IEEE Power & Energy Society, 2011, and Jóhannsson, H. "Development of early warning methods for electric power systems", Ph.D. Thesis, ISBN: 978-87-92465-95-5, a tool for determining the stability boundaries of the power system and the system security margins have been developed. However, while these tools may provide information on an unstable operating condition, none of the developed tools offers a remedy to bring the power system back into a stable operating condition.

Thus, there is a need for a method that can determine a remedial control action to be performed to prevent an emerging blackout and possibly bring the power system back into a stable operating condition upon experiencing instability such as a fall out of one or more power lines or generators.

SUMMARY OF THE INVENTION

It is an object of the present invention to provide a method for determining a remedial control action for a power system in an insecure or unstable operating condition, the remedial control action being configured to bring the power system back into a stable and secure operating condition.

According to the present invention, a method of determining a remedial control action for a power system in an insecure operating condition is provided. The power system has a plurality of generators injecting power into a network having a plurality of nodes and a plurality of branches, the plurality of generators being represented in the network by a plurality of nodes of power injection and each generator has a generator injection impedance and a stability boundary in the injection impedance plane. The method may comprise calculating a system safety boundary in the injection impedance plane for each generator based on a predetermined network operating safety margin in relation to the system stability boundary. For each generator, the generator injection impedance may be compared with the safety boundary and it may be determined whether each generator is safe or unsafe. A remedial control action may be determined, the remedial control action comprising a scheme for re-dispatching power generation for at least each unsafe generator to thereby enable the power system to return to a stable and secure operating condition.

According to another aspect of the present invention, a method of preventing instability in a power system is provided. The power system has a plurality of generators injecting power into a network having a plurality of nodes and a plurality of branches, the plurality of generators being represented in the network by a plurality of nodes of power injection. The method may comprise receiving instability information for the network, the instability information including information on a number of unsafe generators. Stability and security may be restored by determining a new safe operating point in the impedance plane for each unsafe generator, calculating a distance between a determined injection impedance and the new safe operating point under the assumption of constant voltage magnitude at the node of power injection for each unsafe generator, and remedying unsafe generator operation by reducing power generation of the unsafe generator to move the unsafe generator to the new safe operating point.

According to an embodiment of the invention also a computer program comprising program code means for performing the method(s) as herein described when said computer program is run on a computer is provided, and, furthermore, a computer readable medium having stored thereon program code means for performing the method(s) as herein described when said program code means is run on a computer is provided.

According to a further aspect of the present invention, a system for determining a remedial control action for a power system in an insecure operating condition is provided, the power system having a plurality of generators injecting power into a network having a plurality of nodes and a plurality of branches, the plurality of generators being represented in the network by a plurality of nodes of power injection. Each generator may have a generator injection impedance and a stability boundary in the injection impedance plane. The system may further comprise a data processing means configured to calculate a system safety boundary in the injection impedance plane for each generator based on a predetermined network operating safety margin in relation to the system stability boundary, compare for each generator the generator injection impedance with the safety boundary and determining whether each generator is safe or unsafe, and determine a remedial control action. The remedial control action may comprise a scheme for re-dispatching power generation for at least each unsafe generator to thereby enable a stable and secure operating condition for the power system. The system may further comprise a power system regulator configured to implement the remedial control action in the power system.

It is an advantage of the present invention that the method and system allow for an automatic determination of possible counteractions to prevent a power system from experiencing a power blackout. It is a further advantage that by detecting a system generator crossing a safety boundary for aperiodic small-signal stability, or if the safety margin for a generator falls below a certain minimum, the necessary power re-dispatch for the generators in the system to restore stability may be determined analytically. It is advantageous to use the present algebraic approach in that it is much faster than using an iterative approach.

The power system may be any power system having a number of generators and a number of nodes interconnected via a transmission line grid. Typically, the power system will have a plurality of nodes or busses (N), a plurality of branches (M) and a plurality of generators. The branches are interconnecting the nodes, where at each node there may be loads or generators connected.

In a normal operating state of a power system, the system operates in a stable and secure mode. However, a power system might experience a disturbance, such as a severe disturbance or a sequence of disturbing events of same or different character so that the system may become unstable. If the power system is stressed, i.e. for example is highly loaded, and is thus performing close to the stability limits or boundaries of the power system, a single disturbance may lead to an instability in the power system. Instability in the power system, and thus an unstable and insecure operating condition may then occur when the system does not have the ability to restore stability. Typically, one or more generators may loose synchronism to the rest of the system and thus, the system will be in an insecure and unstable operating condition, and e.g. aperiodic small signal instability may appear as aperiodic (non-oscillatory) increase of the rotor angle and subsequently loss of synchronism following e.g. a small disturbance of the system.

Aperiodic small signal stability may refer to the ability of the system generators to establish sufficient synchronizing torque for a given equilibrium condition. Thus, a lack of synchronizing torque may lead to an aperiodic increase of the rotor angle, and thereby to aperiodic small signal instability. Throughout the present description, a reference to instability is a reference to aperiodic small signal instability. Thus, the power system may be in an unstable operating condition when an aperiodic small-signal instability is detected.

Typically, the power system is operated with a certain threshold or margin to a stability limit, and the power system is said to be insecure when such a threshold is exceeded. Thus, the power system may be insecure when it is operating too close to a stability boundary for the system, and may thus be insecure when either a safety boundary or a security boundary as described herein is reached, depending on the set-up of the power system.

For assessing stability of a power system, different methods may be applied focussing on a particular mechanism of stability as mentioned above, and for example, focussing on the capability of each generator to generate sufficient synchronizing torque such that operation at a stable equilibrium point may be maintained. The lack of sufficient steady state synchronizing torque may cause aperiodic increase in rotor angle and, thus, a loss of synchronism. This form of instability may be referred to as aperiodic small signal instability. To accurately assess for example aperiodic small signal instability, the system may be in a steady state operating mode where no transients are present, or in a quasi steady state operating mode wherein few and diminishing transients from other disturbances may be present. Thus, the power system under evaluation may be in an at least quasi steady state.

The generator injection impedance and the stability boundary may be determined by any known method, online or off-line. However, to be able to perform the remedial control action in due time before a black-out occurs, it is preferred to receive information about the generator injection impedance and the stability boundary in real-time.

It is an advantage of the present invention that the method is a dynamic method, and that the method may be based on a present state of the power system, such as a snapshot of the state of the power system, and not on a sequence of time varying snapshots of the state of the power system. Hence, the computational time needed to carry out the assessment may be reduced. Furthermore, also the stability boundary and the generator injection impedance may be determined dynamically, providing real-time input to the method to ensure the possibility to react immediately, such as within seconds, such as within 10 milliseconds, such as within 1 second, within 5 seconds or within 10 seconds, such as between 100 milliseconds and 5 seconds, such as between 1 second and 5 seconds, when an unsecure operating condition is detected.

A present state of the power system may be obtained by measuring voltages and/or currents at a number of nodes in the system. Preferably, voltage and current phasors at a number of nodes are determined by measurement, and alternatively or additionally, also the frequency may be determined by measurement at a number of nodes. In a preferred embodiment of the present invention, the measurements are performed in real-time, and preferably the measurements across the power system are time synchronized, such as time synchronized via a GPS signal.

One method of determining the present state of a power system is by using Phasor Measurement Unit measurements. A phasor measurement unit (PMU) is a device that provides synchronized measurements, in real-time, of voltage and current phasors along with a measurement of frequency, thus the PMU measurements may comprise measurements of voltage and current phasors.

To enable calculations regarding the power system, a model or representation of the power system and the power system operating conditions has been developed. A unique representation of power system operating conditions, providing full observability of the power system, may be obtained in different ways. As an example, for the system with N nodes and M branches, a unique or full, description of a given operating point may be obtained if the network impedances are known together with all of the N node voltage phasors or together with all the currents flowing in the M branches along with the voltage magnitude at one node in the system. Once the network configuration is known, all other network variables may be determined from at least these sets of the M complex current variables and one voltage magnitude (2M+1 real variables) or from the N complex node voltage variables, i.e. the voltage phasors, or 2N real variables, such as N voltage magnitudes and N angles.

A system representation may be characterized in that all power injections into the system enter the network in a node of constant steady state voltage magnitude. Hereby, additional network nodes or branches may be introduced depending on the type of machine excitation control and the status of the machine protection. Further characteristics may comprise representing the load as impedances in the network, and longer term load dynamics may not be included. In that the method of assessing the power system may evaluate the instantaneous operating conditions, the representation may include the instantaneous impedance as seen from each generator.

In that the generators may be represented by power injections at nodes of constant steady state voltage magnitude, the degrees of freedom associated with the determination of the boundaries for aperiodic small signal stability may be reduced.

The stability boundary may be expressed as a boundary of maximum injectable power into a given system node. Injection of power in excess of the maximum injectable power might render the system unstable, i.e. result in a crossing of the stability boundary.

By further comparing for each generator the determined stability boundary with the injection impedance, a generator safety margin for each generator may be determined. Hereby, an indication of where each generator is positioned relative to the determined stability boundary may be provided.

Using the injection impedances prove valuable for determining and/or representing the present operating conditions in a power system, and the stability boundary, the safety boundary and the security boundary, as discussed in more detail below, are represented in the injection impedance plane, and furthermore, each generator is characterized by at least the generator injection impedance.

Both the generator injection impedance and the stability boundary in the injection plane for the plurality of generators in the power system may be determined in any way. In an exemplary embodiment, the stability boundary may be determined as $$Z_{inj} = -\frac{Z_{TH}\sin\theta}{\sin\phi_{TH}}$$

wherein $Z_{TH}$ is the magnitude of the system Thevenin Impedance as seen from the generator, $Z_{inj}$ is the magnitude of the injection impedance; $\phi_{TH}$ is the angle of the Thevenin impedance, $\theta$ is the angle of the injection impedance. That is, when the injection impedance $$Z_{inj} \text{ equals } -\frac{Z_{TH}\sin\theta}{\sin\phi_{TH}}$$

then the generator is at the boundary.

The criteria for stability for a given generator may thus be written as $$C = \left|\frac{\overline{Z}_{inj} \cdot (2\sin\phi_{TH}) + j \cdot Z_{TH}}{Z_{TH}}\right|$$

wherein $Z_{TH}$ is the system Thevenin Impedance as seen from the generator, $\overline{Z}_{inj}$ is the injection impedance, $\phi_{TH}$ is the angle of the system Thevenin Impedance $\overline{Z}_{TH}$ as seen from the generator. The expression C is preferably normalized so that the generator is stable if the value C is larger than 1, the generator is unstable if C is less than 1 and wherein the generator is operating at the stability boundary for C=0. When the generator is stable, typically, an increase in the phase angle at the node results in an increased power injection. If the C is smaller than 1, then the operation of the generator is unstable, and an increase of generator phase angle may result in a decrease of power injection.

The Thevenin Impedance may be calculated using any known method of calculation, and preferably the Thevenin Impedance may be calculated as seen from the generator with all other voltage sources, such as generators, of constant voltage magnitude shorted, as $Z_{TH}=V_{TH}/I_{TH}$.

Typically, power system operators will determine a network operating safety margin in relation to the system stability boundary according to network specifics such as taking into account the size and type of the generator, etc. Based on this predetermined network operating safety margin, a network operating safety boundary in the injection impedance plane may be calculated for each generator in relation to the system stability boundary.

The network operating safety margin may be determined as a preferred minimum distance from an operating point of a generator to the stability boundary for the generator and may e.g. be expressed as a percentage of the injection impedance or a percentage power injection margin to the maximum power injection into the node of constant voltage magnitude.

The margin may for example indicate how much a phase angle for the generator may be increased before the stability boundary is reached. Furthermore, for a specific generator, it may be determined whether an increase in a voltage phase angle at the corresponding node of injection would cause an increase in the injected power.

The network operating safety margin may be automatically determined, such that an operator at any given time has access to information about network operating safety margin for any given generator in the power system or, as applicable, for any node in the system.

Hereby, the system may be operated with all generators having a safety margin of for example 10%, 5%, 2%, 1%, 0.5%, 0.2% etc, or the system may be operated under the condition that no single generator may operate at a margin lower than 0.5%, lower than 2% or lower than 5%, etc.

Generally, a generator operating closer to the stability boundary than indicated by the safety margin is said to be an unsafe generator, whereas a generator operating farther away from the stability boundary than indicated by the safety margin, is a safe generator.

In one or more embodiments of the present invention, the remedial control action may be performed by determining a new safe operating point in the impedance plane for each unsafe generator, and calculating a distance between the generator injection impedance and the new safe operating point under the assumption of constant voltage magnitude at the node of power injection for each unsafe generator. Unsafe generator operation may, thus, be remedied by reducing power generation of the unsafe generator to thereby move the unsafe generator to the new safe operating point. In the impedance plane, this may correspond to moving the generator operating point along a line of constant power injection, as has been established by the present inventors.

Typically, the remedial control action may further comprise the steps of determining missing power in the power network due to the reduced power generation of the unsafe generator(s), determining available power reserves in the power network, and generating at least one re-dispatch solution based on the missing power and the determined available power reserves. A number of re-dispatch solutions may be provided, depending on the power system and the available reserves and the different re-dispatch solutions may involve different numbers of generators, etc. The method may further comprise the step of evaluating the number re-dispatch solutions and prioritize the number of re-dispatch solutions according to pre-defined power system operation criteria such as to provide the fastest remedial control action, the remedial control action involving a minimum number of generators, the remedial control action having the least impact on the generators involved, the remedial control action wherein no other generator become insecure, etc. Preferably, the evaluation is performed automatically according to the pre-defined power system operation criteria.

The method may furthermore comprise the step of automatically performing a selected re-dispatch solution. It is an advantage of automatically performing a selected re-dispatch solution that the re-dispatch may be performed faster without an operator being required to set up and perform a manual re-dispatch of power, thus, enabling a much faster response.

In addition to the stability boundary and the safety boundary, also a security boundary based on a predetermined network operating security margin in relation to the system stability boundary may be provided. The new safe operating point may be selected to be positioned at least at the security boundary, to ensure that the new safe operating point is sufficiently removed from the safety boundary and/or the stability boundary so that a risk of the same generator to become insecure again is minimized. The security boundary may be determined either with respect to the stability boundary, the safety boundary or a combination of the two. The security boundary may thus be determined to have a margin of e.g. 0.2%, 0.3%, 0.5%, 1%, 2%, 5% or 10% in addition to either the safety boundary or the stability boundary.

For determining available power reserves for each safe generator, i.e. each generator being in a stable operating condition, the distance between the determined injection impedance and a secure operating point at the system security boundary for each generator under the assumption of constant voltage magnitude at the node of power injection provides a measure of the available power reserves for each safe generator. In an emergency state in which insufficient power reserves are present in the system, an emergency solution is executed. The emergency solution utilises all the power reserves of the remaining stable generators, while preventing them from crossing the security boundary, and with the aim to move the unsafe operating away from the security boundary but tolerating a new operating point between safety and security boundary.

In one or more embodiments of the present invention, the stability boundary for each generator is determined in real-time to thereby allow for a fast follow up on any instabilities encountered. Likewise, also the remedial control action may be performed in real-time.

The calculation time from determination of the present state of the power system to the restoration may be very short, such as between 5 and 50 ms, such as below 1 second, such as below 50 ms, etc., depending on the size of the power system.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

BRIEF DESCRIPTION OF THE DRAWINGS

FIG. 1*a* shows an electric power system, FIG. 1*b* shows synchronized measurements from two nodes of the electric power system, and FIG. 1*c* shows the resulting phasors in an impedance plane, FIG. 2 shows a generalized electric power system, where system loads are represented as impedances and the generators are assumed to maintain constant terminal voltage.

DETAILED DESCRIPTION OF THE DRAWINGS

Figure 3:
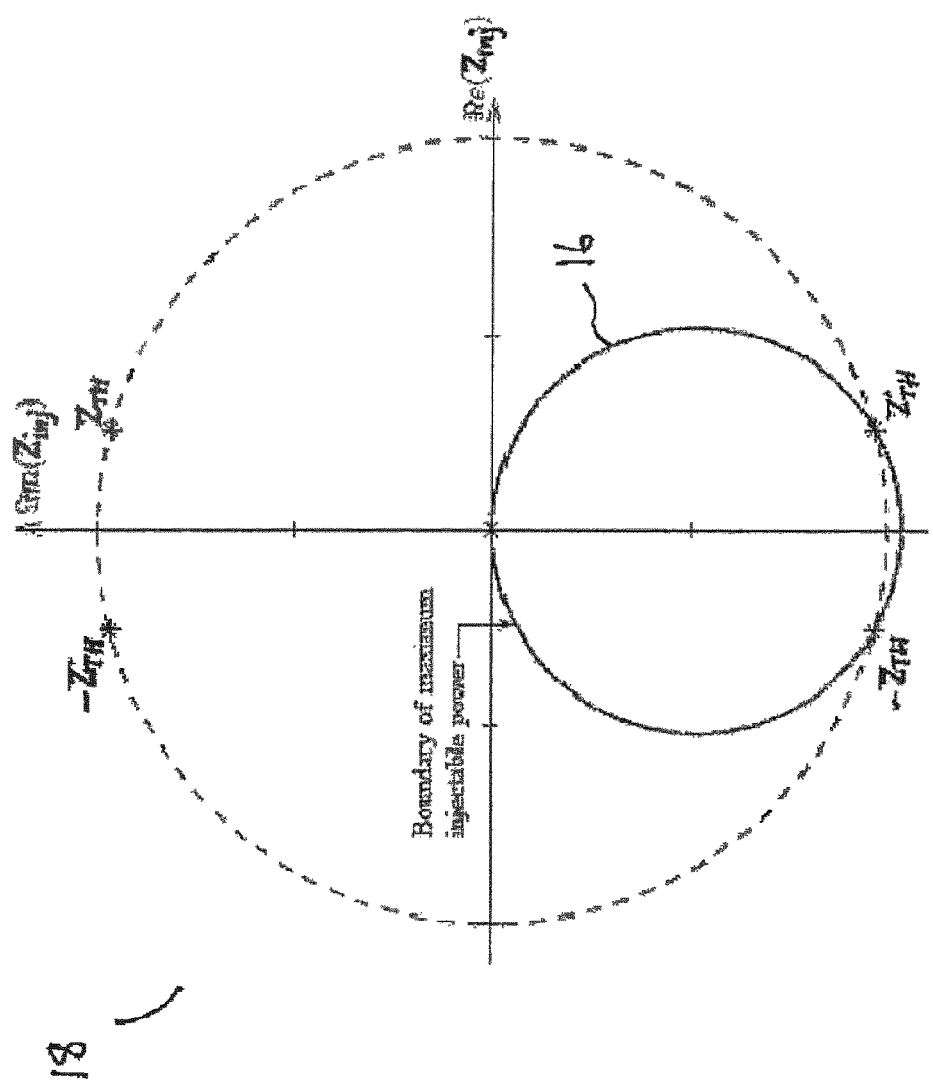
FIG. 3 shows the boundary of aperiodic small signal stability in the injection impedance plane.

In the present description the following terms may be interpreted as follows:

Power stability is the ability of an electric power system, for a given initial operating condition, to regain a state of equilibrium after being subjected to a physical disturbance, with most system variables bound so that practically the entire system remains intact.

Rotor angle stability: The term refers to the ability of synchronous machines, such as generators, to remain in synchronism after being subjected to a disturbance. Small signal rotor angle stability concerns the stability of the system steady state point, and may appear as an aperiodic (non-oscillatory) increase of the rotor angle due to lack of synchronizing torque, or as rotor oscillations of increasing amplitude due to lack of sufficient damping torque.

Aperiodic small signal stability is used to refer to the ability of the system generators to establish sufficient synchronizing torque for a given equilibrium condition. An aperiodic small signal instability appears as aperiodic (non-oscillatory) increase of the rotor angle and subsequent loss of synchronism following a very small disturbance, such as a small increase in applied mechanical power to a generator, or small changes in the system loading.

Frequency stability: relates to the ability of a power system to maintain steady frequency following a severe system disturbance resulting in a significant imbalance between generation and load.

Voltage stability: Refers to the ability of a power system to maintain steady voltages at all nodes in the system after being subjected to a disturbance from a given initial operating condition. Voltage stability is dependent on the system ability to restore equilibrium between load demand and supply.

The terms "bus" and "node" may in the following both be used interchangeably to indicate interconnections in a power system.

FIG. 1a shows a power system 1, where a Phasor Measurement Unit (PMU), or another measurement device that provide synchronized measurements in real time, of voltage and current phasors along with frequency measurements, is installed at node 1 and node 2. The synchronized measurements are shown in FIG. 1b, for node 1 and node 2, respectively.

FIG. 1c shows the resulting phasors $\vec{V}_1$ and $\vec{V}_2$ plotted in the same complex plane. The phase difference θ between the signals from node 1 and node 2, respectively, is indicated.

Power network real-time measurements of system parameter may provide a so called full observability of the system grid. The full network observability may then be used to establish a deterministic representation of the system conditions, where the system representation has the following characteristics or preconditions:

All power injections into the system enter the network in a node of constant steady state voltage magnitude.

This may result in the introduction of additional network nodes and branches compared to the physical system depending on the type machine excitation control and status of machine protection The load is represented as impedances in the network Hereby, some longer term load dynamics may not be included in the model and the method preferably evaluates the instantaneous operating conditions, so therefore the instantaneous impedance as seen from the generators is preferably represented.

By representing the power injections at nodes of constant steady state voltage magnitude may result in a reduction of the degrees of freedom associated with the determination of the boundaries for aperiodic small signal stability.

An exemplary power system 10 is shown in FIG. 2. FIG. 2 shows the power system 10 where all loads are represented as constant impedances 13 and where all generators 11 are assumed to maintain a constant terminal voltage. With all system impedances 13 known, the system operating conditions can be determined from the generators 11 terminal voltages ($\vec{V}_1$, $\vec{V}_2$, $\vec{V}_3$ and $\vec{V}_4$).

The power system 10 comprises the generators 11 and the network 14. In the network 14, the generators are represented by nodes of power injection 16. The nodes 15 and the impedances 13 are interconnected via branches 12. The generators are in FIG. 2 assumed to maintain a constant terminal voltage. Thus, the generalized notation used below corresponds to a generalized system as shown in FIG. 2.

FIG. 3 shows how the stability boundary 16 for aperiodic small signal stability appears in an injection impedance plane 18 for a given generator, such as generators 11 as shown in FIG. 2. The boundary may be derived from the below expression $$Z_{inj} = -\frac{Z_{TH}\sin\theta}{\sin\phi_{TH}}$$

wherein $Z_{TH}$ is the system Thevenin Impedance as seen from the generator, $Z_{inj}$ is the injection impedance; $\phi_{TH}$ is the angle of the system, and $Z_{th}$ the Thevenin Impedance.

The stability boundary 16 thus appears as a circle in the Impedance plane and when $Z_{inj}$ equals the above expression, the circle has a radius of $r=Z_{TH}(2 \sin \phi_{TH})$. Operating the power system outside the circle, that is with an injection impedance larger than $Z_{TH}(2 \sin \phi_{TH})$ indicates a stable operating condition where a relative increase in the phase angle at the node of injection results in increased injection. An operation inside the circle that is with an injection impedance smaller than $Z_{TH}(2 \sin \phi_{TH})$ represents an unstable condition characterized in that in this condition, a decrease in the injected power will result in an increase of the phase angle at the node of injection. By utilizing the above equation, the aperiodic small signal stability of a given generator may therefore be described by the following set of inequalities, so that C is the criteria for stability for a given generator is $$C = \left| \frac{\overline{Z}_{inj} \cdot (2\sin\phi_{TH}) + j \cdot Z_{TH}}{Z_{TH}} \right| \begin{cases} > 1 & \text{Stable operation} \\ = 1 & \text{At the boundary} \\ < 1 & \text{Unstable operation} \end{cases}$$

Thus, from the above, it is seen that an insecure or unstable operation condition may be detected by modelling the power system as suggested in FIGS. 2 and 3.

Figure 4:
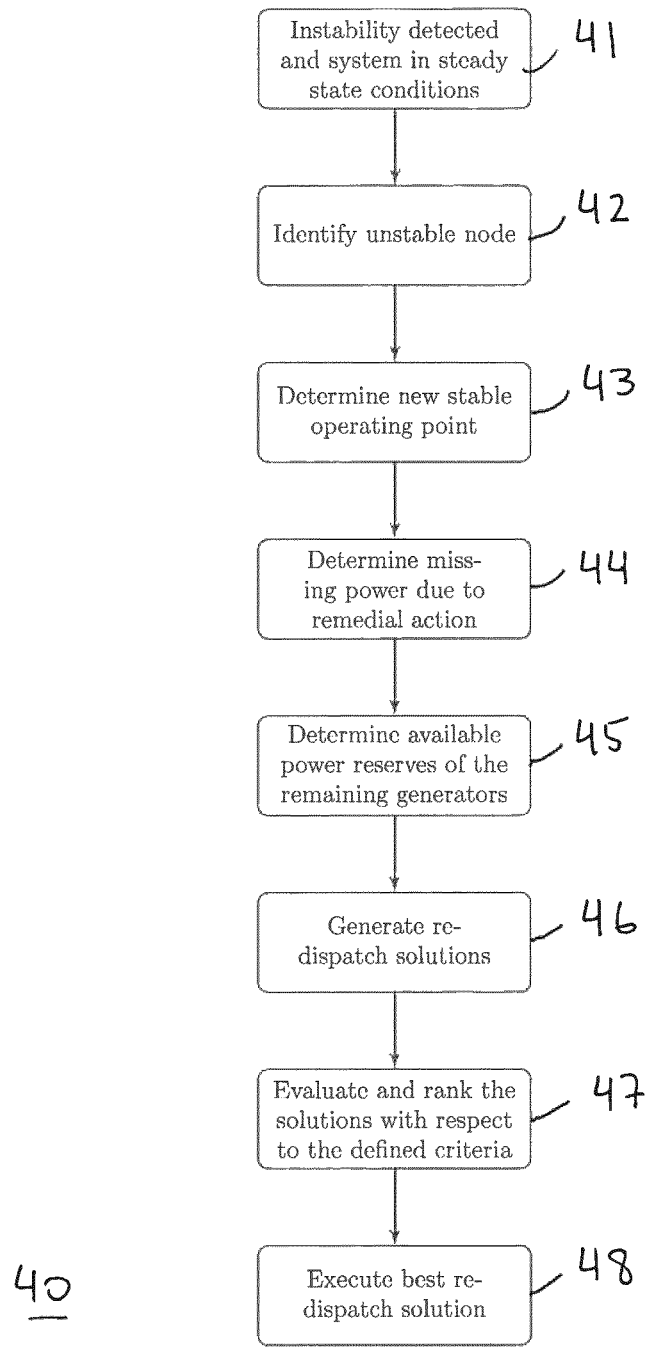
FIG. 4 shows a flow chart of a method according to the present invention.

FIG. 4 shows a flow chart 40 showing a method of remedying an instable power system. In 41, an instability is detected, and it may further be determined that the system is in at least a quasi steady state and the insecure node is identified in 42. In 43, a new safe or stable operating point is determined, and missing power to arrive at the new safe operating point is determined in 44. It is envisaged that the method may be terminated here by providing the information of the missing power. However, the method may further comprise the step of determining the power reserves of the reamining generators in 45, and generate one or more re-dispatch solutions in 46. Preferably, the solutions are automatically evaluated and ranked with respect to pre-defined criteria, and the best re-dispatch solution may be executed in the power system.

Figure 5:
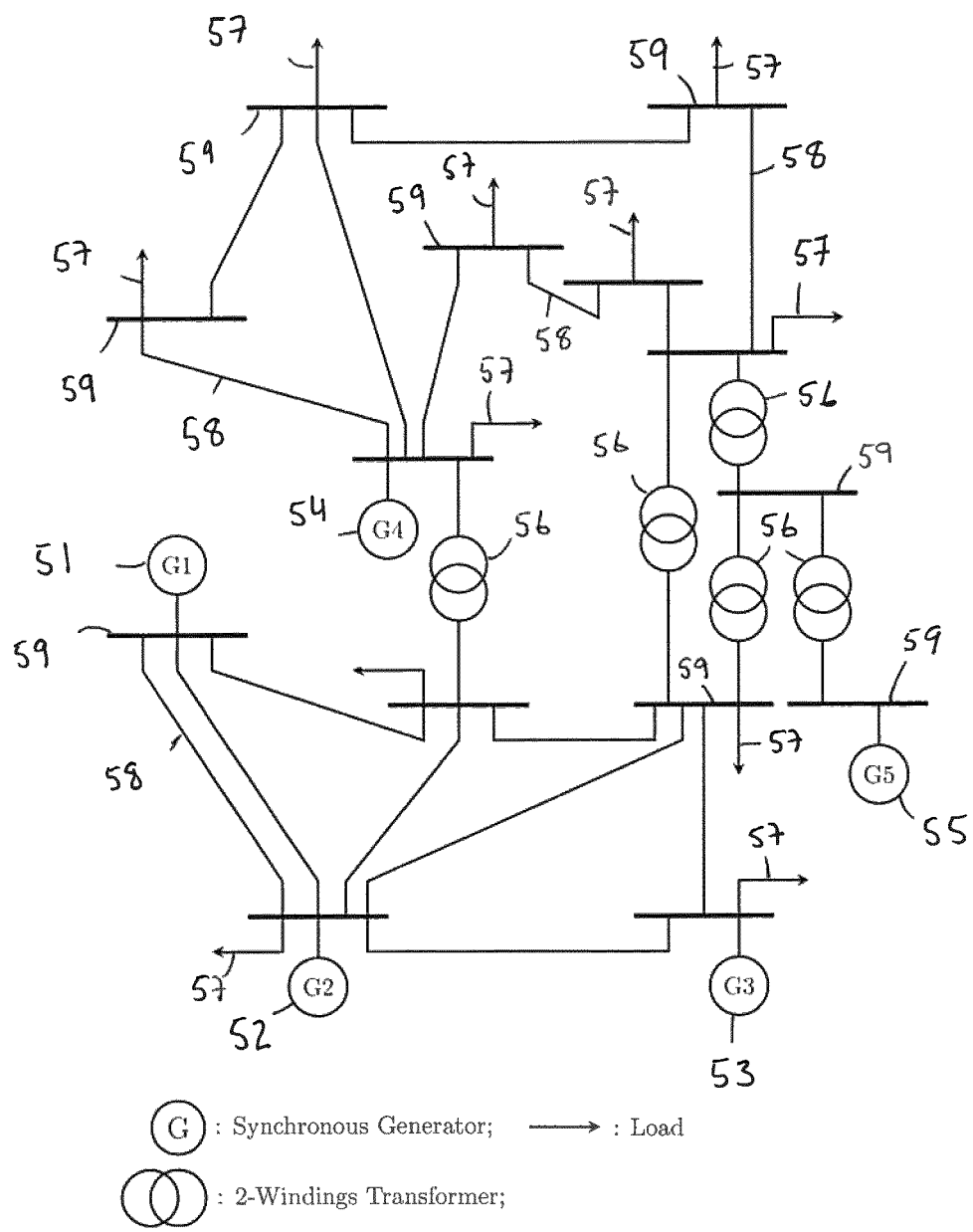
FIG. 5 shows an exemplary power system having five synchronous generators.

FIG. 5 shows a model of a power system having five generators 51, 52, 53, 54 and 55, a plurality of 2-winding transformers 56, and loads indicated by arrows 57, interconnected by transmission lines 58 interconnecting nodes 59.

In the following a scenario is described, wherein a chain of events leads to a loss of aperiodic small signal stability of a manually excited generator. In the pre-fault conditions, the system may be characterized by the following parameters, where P is the power of the generators 51, 52, 53, 54, 55, and $P/P_{max}$ is the utilization factor, i.e. the percentage of power with respect to maximum injectable power and size is the maximum injectable power for the generator.

| Generator | G1 | G2 | G3 | G4 | G5 |
|---|---|---|---|---|---|
| P [MW]: | 100.00 | 68.00 | 55.00 | 20.00 | 130.61 |
| Size [MV A]: | 200.00 | 75.00 | 75.00 | 25.00 | inf |
| $P/P_{max}$ in [%] | 50.00 | 90.67 | 73.33 | 80.00 | — |

Figure 6:
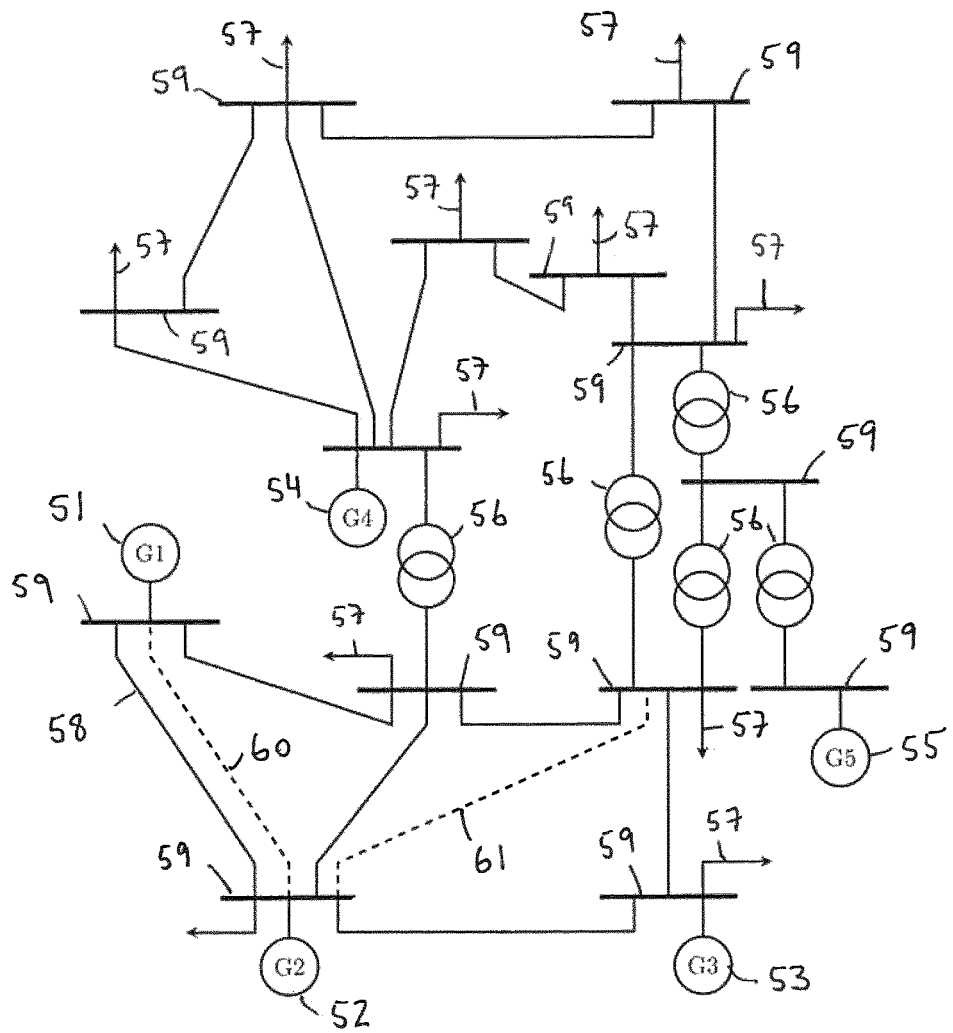
FIG. 6 shows the exemplary power system in FIG. 5 wherein some transmission lines are out of service.

It is seen that the generator G2, 52, is operated close to its limits having a utilization factor of 90.67%, thus the power system is in a highly loaded state. In order to provoke an instability, the power system was further stressed by applying two disturbances, one after another, as seen in FIG. 6, wherein the transmission lines 60 and 61 are out of service. The disturbances were the tripping of two transmission lines 60 and 61, which for example may be caused by a short circuit of a transmission line due to a tree contact.

At a time t=0 sec, the simulation begins and the power system is in a stable and steady condition. At time t=2 s, the line 60 is tripped. The tripping of this line leads to oscillations in the system which damps out after approximately 15 s. At time t=40 s another line, line 61 is tripped. This causes a fluctuation which damp out within 5-10 s, but the voltage magnitudes at other nodes begin to slowly decrease. At time t=100 seconds, the voltage collapses.

Thus, it is seen that even small disturbances may in e.g. cases where the load is high, lead to collapse of the power system.

Figure 7A:
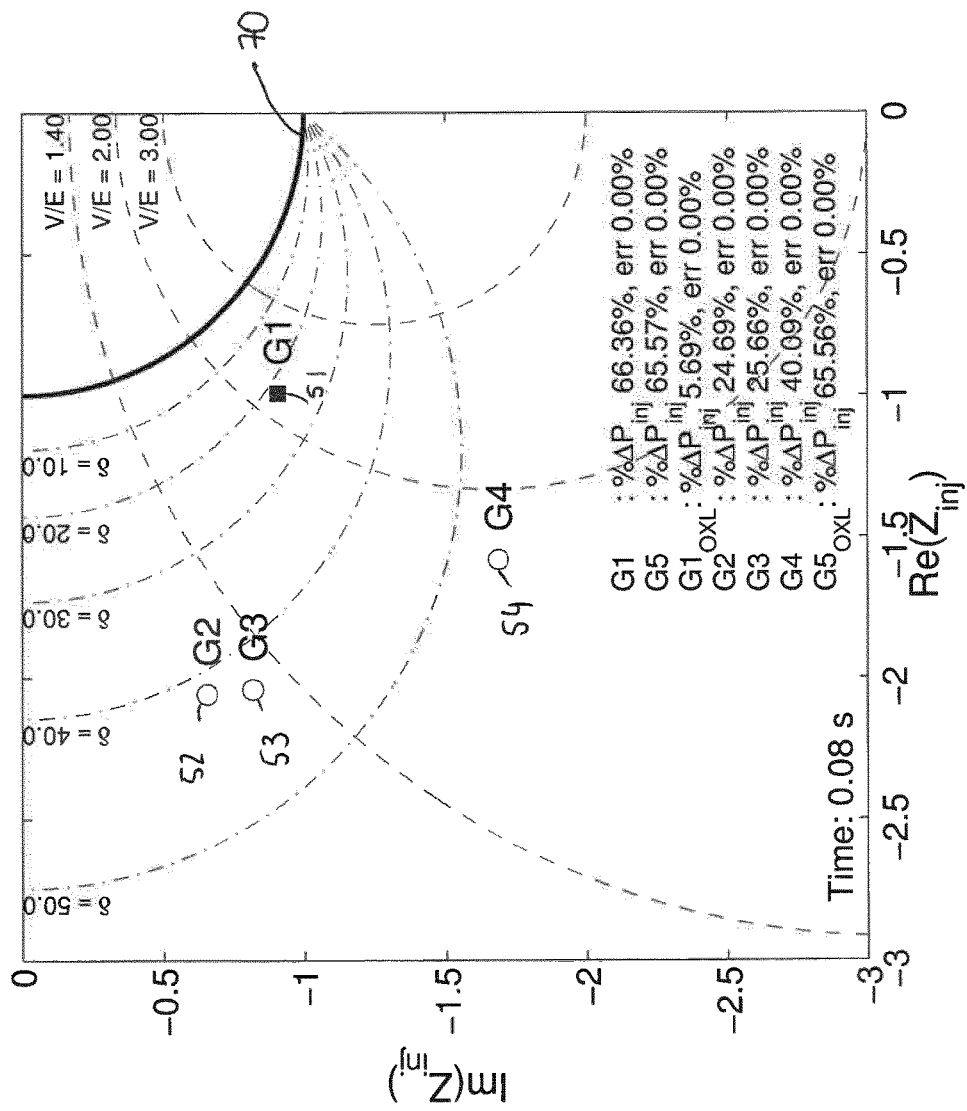
FIG. 7a shows the operating points for four of the generators of FIGS. 4 and 5 in the impedance plane for a power system in a stable operating condition.
Figure 7B:
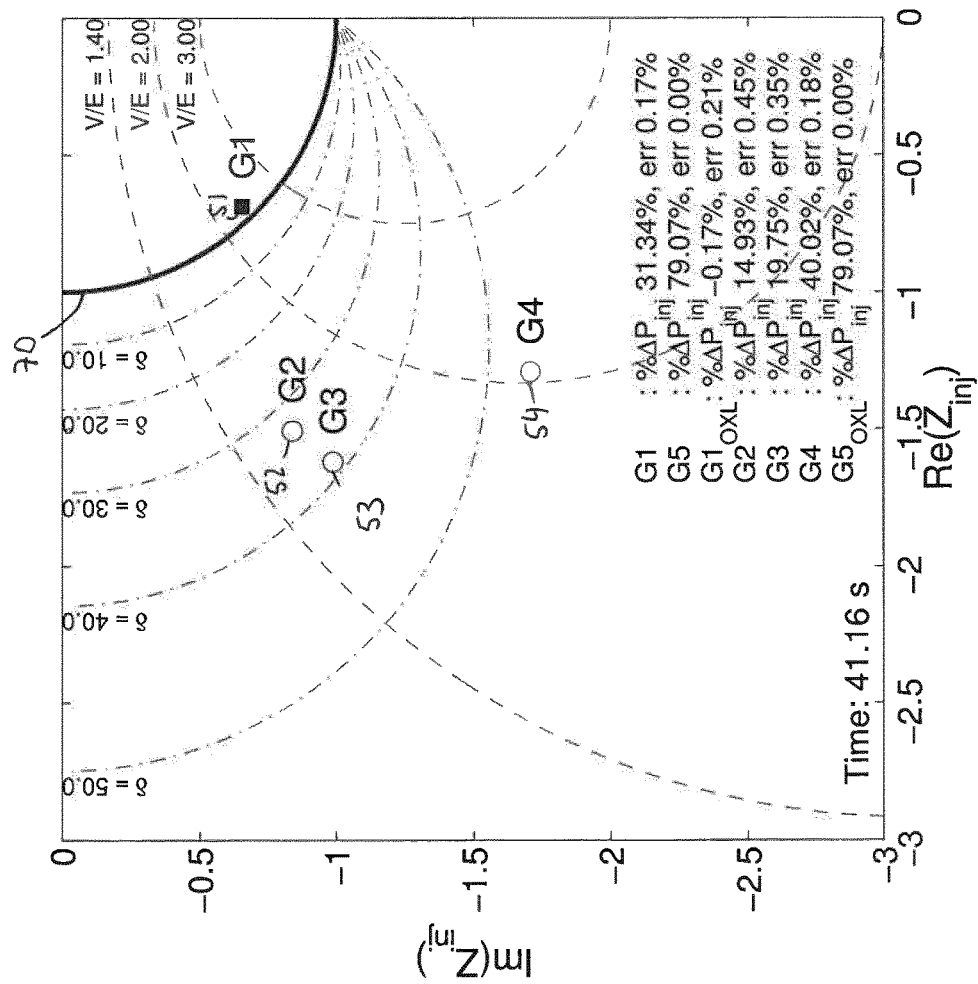
FIG. 7b shows the operating points for the four generators of FIG. 7a in the impedance plane for a power system in an unstable operating condition.

By monitoring the power system, with a method, e.g. as disclosed by Hjörtur Jóhannsson and described under the prior art section, aperiodic small signal instability may be detected immediately after they occur. Initially at t=0.08 seconds, when no disturbances has occurred, all the generators, G1 to G5, 51, 52, 53, 54, and 55 are operating in a stable mode as seen in FIG. 7a, where all generator operating points are outside of the stability boundary. However, from FIG. 7b, it is seen that shortly after the second disturbance at time t=41.16 seconds, the operating point of the generator G1, 51, is seen to have moved to the unstable side of the stability boundary 70 as shown in the normalized injection impedance plane.

Figure 7C:
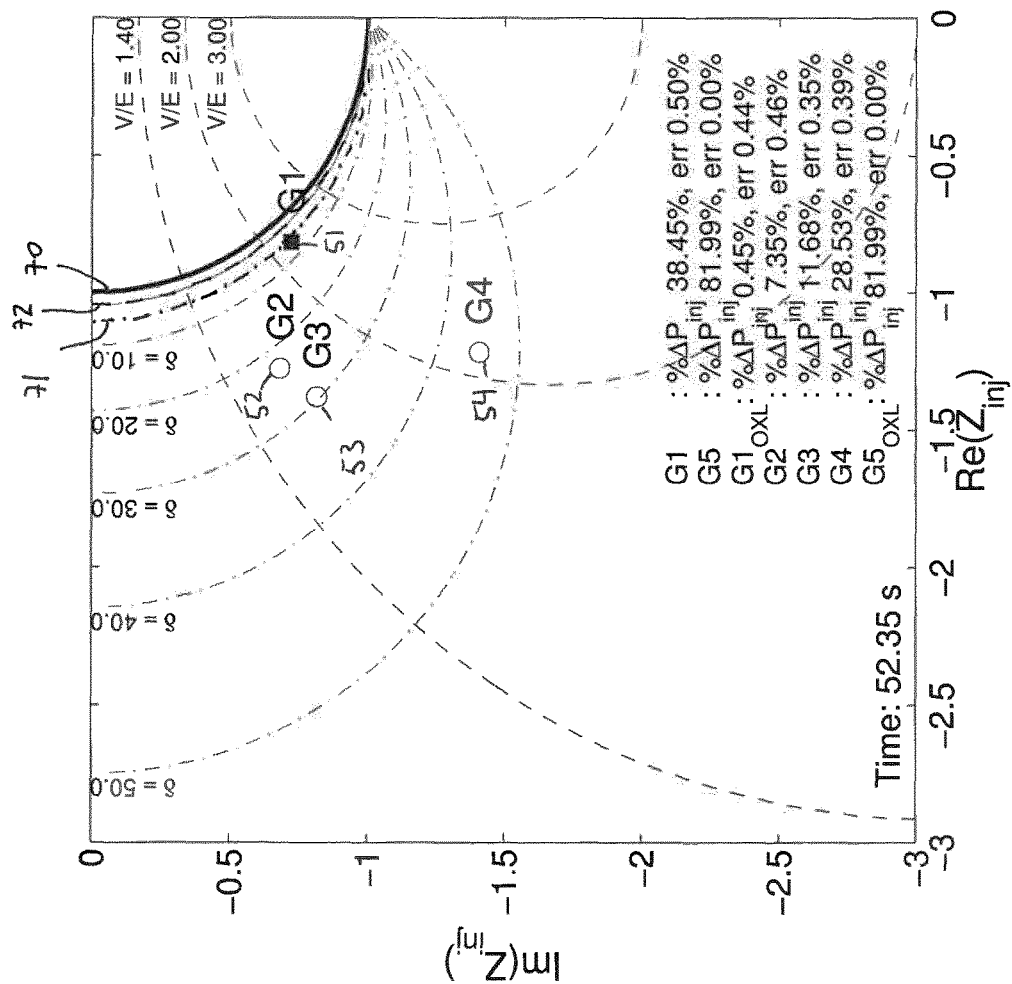
FIG. 7c shows the operating points for the four generators in the impedance plane for a power system after a remedial control action have been performed, FIG. 8 show the safety boundary, the stability boundary and the security boundary in an injection impedance plane.

To apply a remedial control action a security and a safety boundary were chosen to be a power injection margin of 0.5% and 0.1% of the maximum power injection into the node of constant voltage magnitude, respectively, and the stability boundary 70, the security boundary 71 and the safety boundary 72 are shown in FIG. 7c. In FIG. 7c, at t=52.35 seconds the remedial control action has been applied, and it is seen that after the remedial control action, the generator operating point for generator G1, 51, has been moved to the security boundary 71 in the normalized injection impedance plane.

Thus, by performing remedial control actions, the collapse of the power system was avoided.

Figure 8:
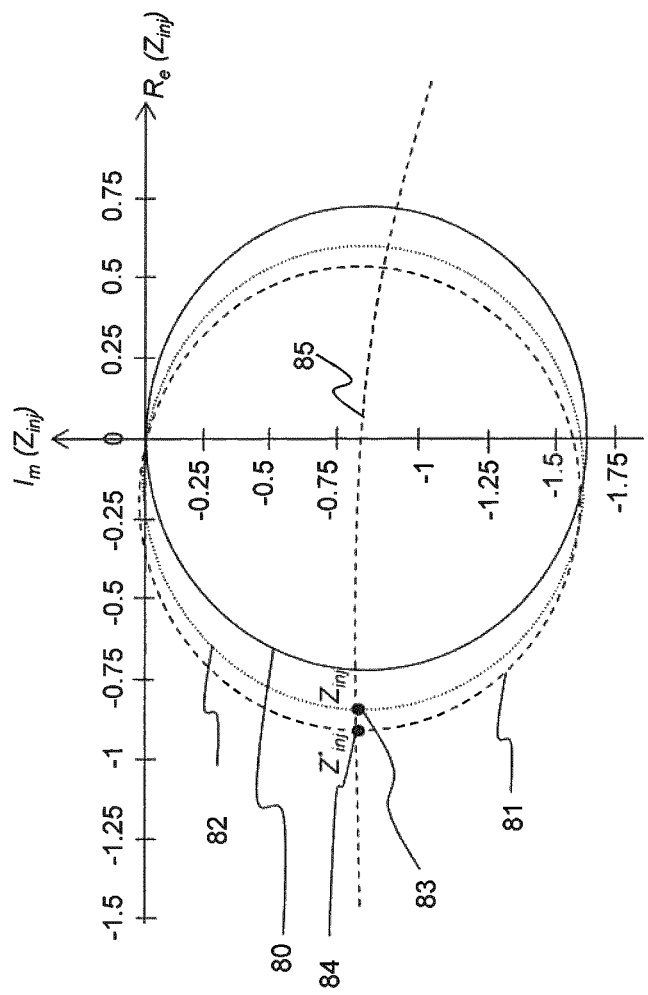

The stability boundary 80, the security boundary 81 and the safety boundary 82 are shown in more detail in the normalized injection impedance plane in FIG. 8.

It is seen that the remedial control action is triggered when the safety boundary 82 is crossed, and thus, as the generator, e.g. generator 51, reaches the safety boundary 82, the necessary power reduction for generator G1, 51, to bring the generator G1, 51, from an operating point 83 on the safety boundary to a new safe operating point 84 on the security boundary 81 is determined.

In the present example, the necessary active power reduction is determined to be 22.43 MW which corresponds to the distance between the operating point 83 and the new safe operating point 84 in the injection impedance plane along the line 85 of constant voltage. Subsequently, the method determined the available active power reserves of the remaining stable generators. The available power reserves for generators 52, 53 and 54 are seen below:

| Generator | 2 | 3 | 4 |
|---|---|---|---|
| $\Delta P_{reserve}$ [MW]: | 9.71 | 9.69 | 4.90 |
| P [MW]: | 64.92 | 64.93 | 19.98 |
| Size [MV A]: | 75.00 | 75.00 | 25.00 |
| $P_{inj, max}$ in [MW]: | 76.31 | 80.91 | 33.30 |

It should be noted, that the generators' power reserves are limited due to the particular size of the machine and that the maximum injection power was in this case not the limiting factor. The next step was to identify the possible solutions to substitute the missing power. It was found, that none of the remaining generators provide a sufficient power reserve to handle the missing power by itself. In the current case only a group solution provides the necessary power reserves. Eventually a solution was found, where the generators 52 to 54 participate and take over the missing power. The table below shows the changes applied to each generator as well as the new active power injection and utilization factor.

| Generator: | 1 | 2 | 3 | 4 | 5 |
|---|---|---|---|---|---|
| ΔP [MW]: | −22.43 MW | 8.96 | 8.96 | 4.52 | — |
| P [MW]: | 157.35 | 73.88 | 73.88 | 24.50 | 51.62 |
| Size [MV A]: | 200.0 | 75.00 | 75.00 | 25.00 | inf |
| $P/P_{max}$ in [%]: | 78.68 | 98.5 | 98.5 | 98.00 | — |

Figure 9:
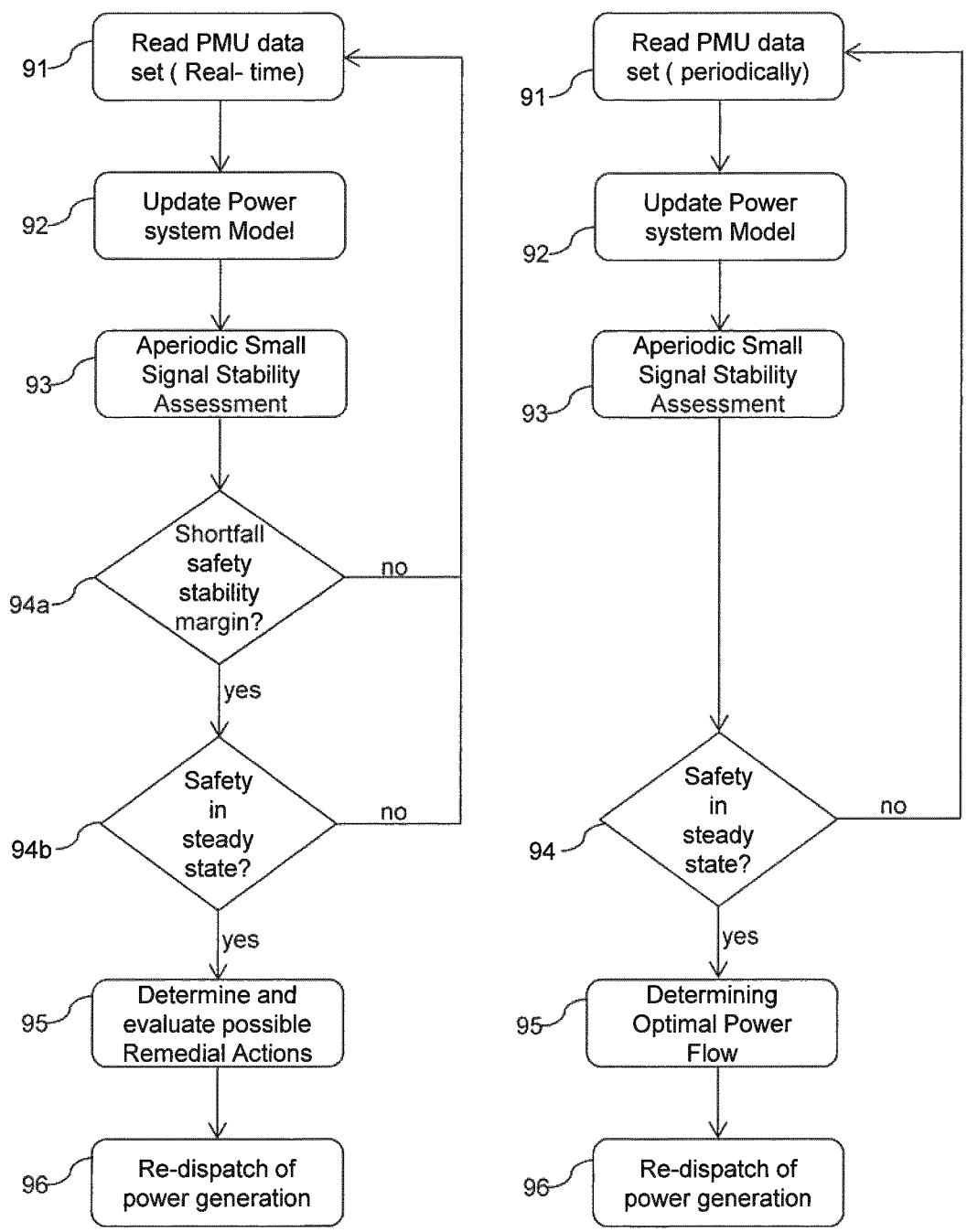
FIG. 9 shows a flow chart of a sequence for a remedial control action using a fast and an optimized approach, respectively.

The remedial control action may be performed in a number of ways, assuming that an early warning method, such as the early warning method described by Johansson above, provides continous information of any instability in the system. In FIG. 9, a flow chart 90 shows an overview of the method. The Early Warning Method may be running continuously in the background, and reading PMU data sets in real time or periodically, step 91, and update the power system model with every PMU data set, step 92, and determine the aperiodic small signal stability margin for each generator in the system, step 93. If one of the generators stability margin falls below the defined safety margin or even instability of a generator operating point is detected, the remedial control action is initiated. First, the steadiness of the power system is evaluated in step 94 or possibly in step 94a or 94b. If the system is insecure and in steady state, possible remedial control actions are determined, step 95. Step 95 is shown to include the evaluation and the ranking of the found solutions. In step 96, re-dispatch of power generation is effectuated.

Figure 10:
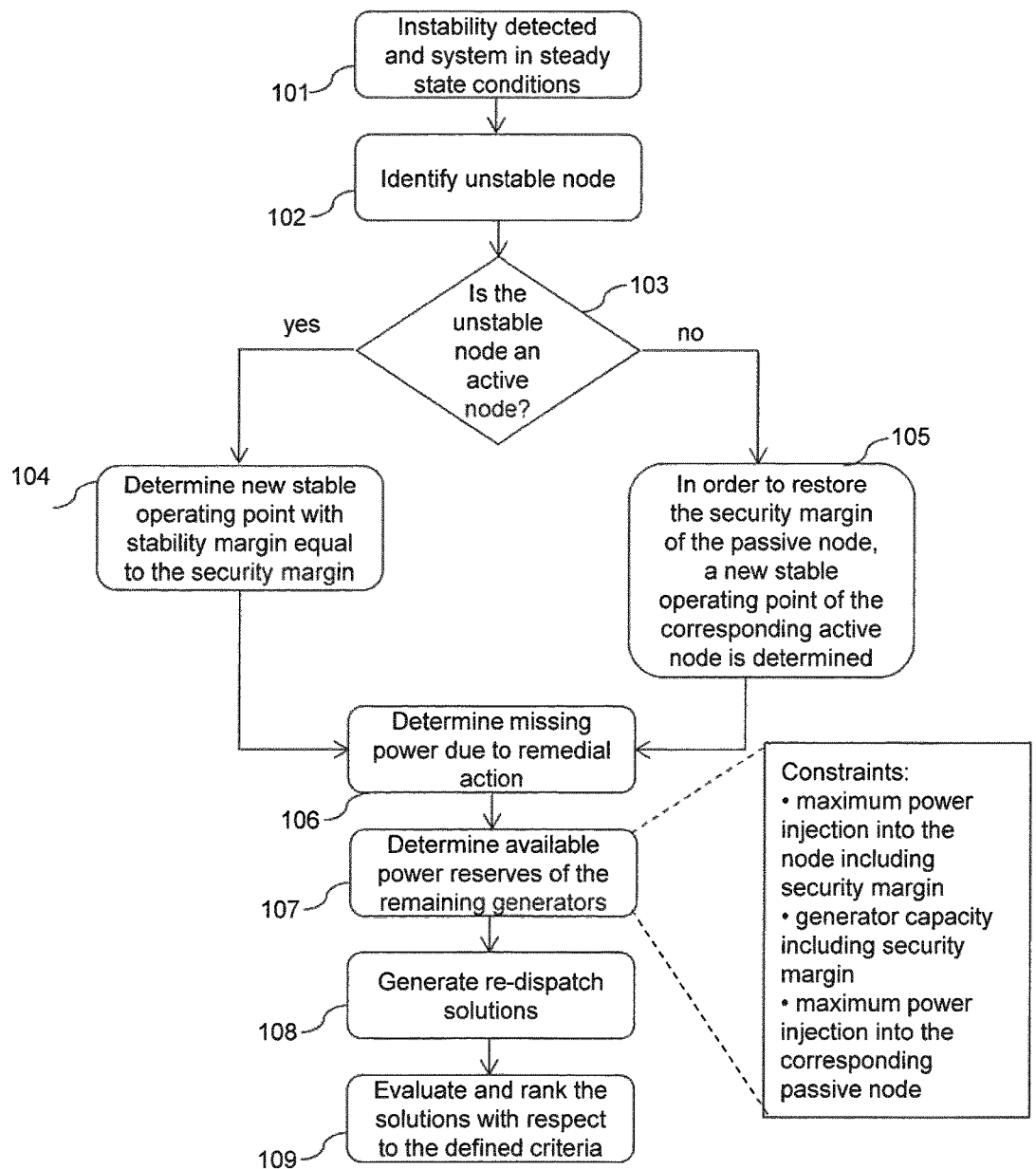
FIG. 10 shows a flow chart illustrating a determination of a remedial control action.

In FIG. 10, a more detailed flow chart 100 illustrating the method of determining a remedial control action is provided. In step 101, an instability is detected and the system is found to be in at least a quasi steady state. In the next step, 102, the node that triggered the instability is identified. In steps 103, 104 and 105, it is analyzed, if the node is an active or passive node. Depending on the status of the node, the calculation of the necessary power reduction is determined in step 106. After the power reduction is calculated, the available power reserves are determined, step 107, and different possible reschedule solutions for the available generators are analyzed. In step 108, a re-dispatch solution is generated and the solutions are evaluated and ranked according to pre-defined criteria in step 109.

Figure 11:
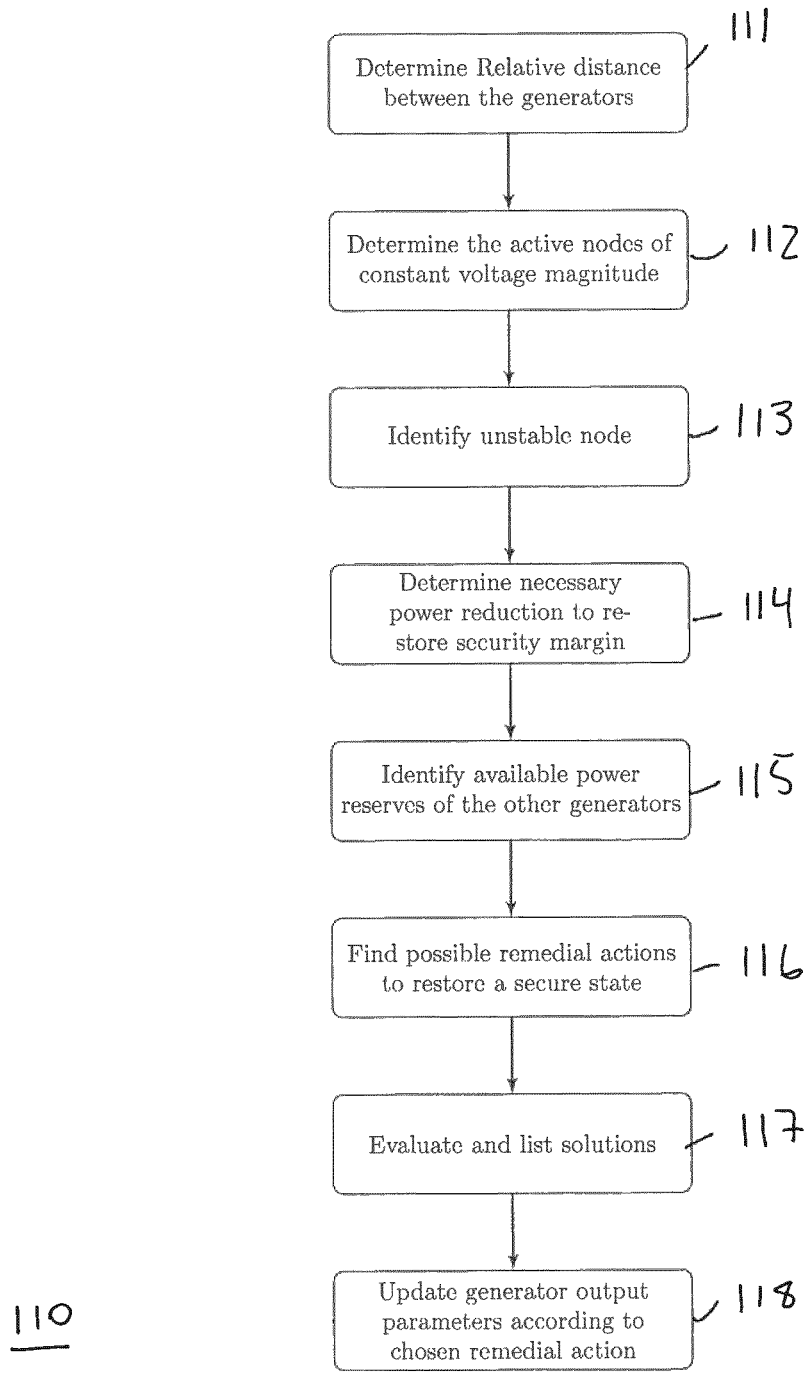
FIG. 11 shows a flow chart illustrating the determination and carrying out of a remedial control action.

In FIG. 11, a remedial control action routine 110 to determine and carry out the remedial control action is shown. The remedial control action routine is executed in case of a shortfall of the stability margin of at least one of the generators in the system, the routine determines the relative electrical distance between the generators in step 111, and determine the active nodes of constant voltage magnitude in step 112, in step 113 an insecure node is identified, and the necessary power reduction to restore security margin is determined in step 114. In step 115, the available power reserves of the other generators are determined, and the possible remedial control actions to restore a secure state are found in step 116. The solutions are verified, evaluated and listed in step 117, and the generator output parameters are updated according to the chosen remedial control action. Thus, the routine analyses the conditions of the remaining generators, determines their power reserves and derives possible remedial control actions, in order to restore a stable and secure system condition.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as being a reference to the plural and vice versa.

A person skilled in the art will readily appreciate that various parameters disclosed in the description may be modified and that various embodiments disclosed and/or claimed may be combined without departing from the scope of the invention.

The invention claimed is:

1. A method of determining a remedial control action for a power system in an insecure operating condition, the power system having a plurality of generators injecting power into a network having a plurality of nodes and a plurality of branches, the plurality of generators being represented in the network by a plurality of nodes of power injection, each generator having a generator injection impedance and a stability boundary in an injection impedance plane, the method comprising
    calculating a system safety boundary in the injection impedance plane for each generator based on a predetermined network operating safety margin in relation to the system stability boundary,
    comparing for each generator the generator injection impedance with the safety boundary and determining whether each generator is safe or unsafe,
    reducing power generation for each generator determined to be unsafe; and
    determining a remedial control action, the remedial control action comprising a scheme for re-dispatching power generation for at least each unsafe generator to thereby establish a secure operating condition for the power system.

2. The method according to claim 1, wherein the remedial control action is performed by
    determining a new safe operating point in the impedance plane for each unsafe generator,
    calculating a distance between the generator injection impedance and the new safe operating point under the assumption of constant voltage magnitude at the node of power injection for each unsafe generator,
    wherein reducing power generation for each generator comprises reducing power generation of the unsafe generator to the new safe operating point.

3. The method according to claim 2, wherein remedial control action further comprises the steps of
    determining missing power in the power network due to the remedying action,
    determining available power reserves in the power network, and
    generating at least one re-dispatch solution.

4. The method according to claim 3, wherein a number of re-dispatch solutions are provided, and wherein the method further comprises the step of evaluating the number re-dispatch solutions and prioritize the number of re-dispatch solutions according pre-defined power system operation criteria.

5. The method according to claim 3, wherein the method further comprises the step of automatically performing a selected re-dispatch solution.

6. The method according to claim 1, wherein the method further comprises the step of determining a security boundary based on a predetermined network operating security margin in relation to the system stability boundary, and determining the new safe operating point at least on the security boundary.

7. The method according to claim 6, wherein the available power reserves for each safe generator in the system is determined as the distance between the determined injection impedance and a secure operating point at the system security boundary under the assumption of constant voltage magnitude at the node of power injection.

8. The method according to claim 1, wherein the power system is in an at least quasi steady state.

9. The method according to claim 1, wherein the stability boundary for each generator is determined in real-time.

10. The method according to claim 1, wherein the remedial control action is performed in real-time.

11. A method of determining a remedial control action in a power system in an insecure operating condition, the power system having a plurality of generators injecting power into a network having a plurality of nodes and a plurality of branches, the plurality of generators being represented in the network by a plurality of nodes of power injection, the method comprising:
   receiving stability information for the network, the stability information including information on a number of unsafe generators,
   restoring secure operation by
   determining a new safe operating point in an impedance plane for each unsafe generator,
   calculating a distance between a determined injection impedance and the new safe operating point under the assumption of constant voltage magnitude at the node of power injection for each unsafe generator,
   reducing power generation of the unsafe to the new safe operating point to thereby remedy operation of the unsafe generator.

12. A non-transitory computer readable medium having stored thereon instruction code for performing the method of claim 1 when said instruction code is run on a computer.

13. A system for determining a remedial control action for a power system in an insecure operating condition,
   the power system having a plurality of generators injecting power into a network having a plurality of nodes and a plurality of branches, the plurality of generators being represented in the network by a plurality of nodes of power injection, each generator having a generator injection impedance and a stability boundary in an injection impedance plane, the system comprising
   a processor; and
   a non-transitory computer readable medium coupled to the processor that stores instruction code that when executed by the processor causes the processor to:
   calculate a system safety boundary in the injection impedance plane for each generator based on a predetermined network operating safety margin in relation to the system stability boundary,
   compare for each generator the generator injection impedance with the safety boundary and determining whether each generator is safe or unsafe,
   control each generator determined to be unsafe to reduce power generation, and
   determine a remedial control action, the remedial control action comprising a scheme for re-dispatching power generation for at least each unsafe generator to thereby establish a stable operating condition for the power system.

14. The system according to claim 13, the system further comprising a power system regulator configured to implement the remedial control action in the power system.

15. The method according to claim 4, wherein the method further comprises the step of automatically performing a selected re-dispatch solution.

16. The method according to claim 2, wherein the method further comprises the step of determining a security boundary based on a predetermined network operating security margin in relation to the system stability boundary, and determining the new safe operating point at least on the security boundary.

17. The method according to any claim 2, wherein the power system is in an at least quasi steady state.

18. The method according to claim 2, wherein the stability boundary for each generator is determined in real-time.

19. The method according to claim 2, wherein the remedial control action is performed in real-time.

* * * * *